(12) United States Patent
Niu et al.

(10) Patent No.: US 11,541,814 B2
(45) Date of Patent: Jan. 3, 2023

(54) NEAR INFRA-RED EMITTING REARVIEW ASSEMBLY

(71) Applicant: GENTEX CORPORATION, Zeeland, MI (US)

(72) Inventors: Xiaoxu Niu, Grand Rapids, MI (US); Kurtis L. Geerlings, Zeeland, MI (US); Joshua D. Lintz, Allendale, MI (US); Andrew D. Weller, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 65 days.

(21) Appl. No.: 17/205,058

(22) Filed: Mar. 18, 2021

(65) Prior Publication Data

US 2021/0291737 A1    Sep. 23, 2021

Related U.S. Application Data

(60) Provisional application No. 62/991,218, filed on Mar. 18, 2020.

(51) Int. Cl.
*B60R 1/12*    (2006.01)
*B60R 11/04*    (2006.01)

(52) U.S. Cl.
CPC ............. *B60R 1/12* (2013.01); *B60R 11/04* (2013.01); *B60R 2001/1223* (2013.01); *B60R 2001/1253* (2013.01)

(58) Field of Classification Search
None
See application file for complete search history.

(56) References Cited

U.S. PATENT DOCUMENTS

| 5,253,109 A | 10/1993 | O'Farrell et al. |
| 2010/0201896 A1 | 8/2010 | Ostreko et al. |
| 2018/0118113 A1 | 5/2018 | Sun |

FOREIGN PATENT DOCUMENTS

| WO | 2007005688 A1 | 1/2007 |
| WO | 2017148055 | * 9/2017 |

OTHER PUBLICATIONS

International Search Report dated Jun. 24, 2021, for corresponding PCT application No. PCT/US2021/022883, 2 pages.
Written Opinion dated Jun. 24, 2021, for corresponding PCT application No. PCT/US2021/022883, 5 pages.

* cited by examiner

*Primary Examiner* — Ashok Patel
(74) *Attorney, Agent, or Firm* — Price Heneveld LLP; Brian James Brewer (57) ABSTRACT

A system and rearview assembly is disclosed. The system includes a rearview assembly, an imager, and a controller. The rearview assembly comprises a backlight. Further, the rearview assembly is operable to provide a driver with a view of a scene rearward of a vehicle. Additionally, the rearview assembly is operable to emit light to illuminate the driver with at least one of infra-red and near infra-red light from the backlight. The imager is operable to image the driver in the at least one of infra-red and near infra-red light. The controller is communicatively connected to the imager and operable to analyze images of the driver to perform at least one of a biometric and a driver awareness analysis.

7 Claims, 8 Drawing Sheets

NEAR INFRA-RED EMITTING REARVIEW ASSEMBLY

CROSS-REFERENCE TO RELATED APPLICATIONS

This application claims priority under 35 U.S.C. § 119(e) to U.S. Provisional Application No. 62/991,218 filed on Mar. 18, 2020, entitled "NEAR INFRA-RED EMITTING REARVIEW ASSEMBLY," the disclosure of which is hereby incorporated by reference in its entirety.

FIELD OF INVENTION

The present invention relates in general to illumination devices and imaging systems. More particularly, the present invention is related to near-infra red illumination and imaging.

BACKGROUND OF INVENTION

Systems for imaging in the infra-red and near infra-red regions of the electromagnetic spectrum have been around for quite some time. Such systems often rely on point source emitters to provide adequate near infra-red illumination for imaging. These systems have become increasingly implemented in motor vehicles. However, these systems often suffer from poor heat dissipation, emitter visibility, uniform illumination, and retina reflected glare. Accordingly, there is a need for improved illumination devices and imaging systems.

SUMMARY

In accordance with the present disclosure, the problems associated with imaging in the infra-red and near infra-red regions of the electromagnetic spectrum within a vehicle, have been substantially reduced or eliminated.

According to one aspect of the present disclosure, a rearview assembly is disclosed. The rearview assembly may include a backlight, a light diffuser, and/or a transflective element. The backlight may be operable to emit light in a first direction. The emitted light may have a first wavelength range. The first wavelength range may be associated with at least one of infra-red and near infra-red light. The light diffuser may be disposed in the first direction relative the backlight. The transflective element may be operable to substantially transmit light in the first wavelength range and substantially reflect visible light. Further, the transflective element may be disposed in the first direction relative the light diffuser.

In some embodiments, the rearview assembly may further comprise an electro-optic element. The electro-optic element may be disposed in the first direction relative the light diffuser. Further, the electro-optic element may comprise a first substrate, a second substate, a first electrode, a second electrode, and an electro-optic medium. The first substrate may have a first surface and a second surface. The second substrate may have a third surface and a fourth surface. Further, the second substrate may be disposed in a spaced apart relationship with the first substrate. The first electrode may be associated with the second surface. The second electrode may be associated with the third surface. The electro-optic medium may be disposed between the first and second substates. Further, the electro-optic medium may be operable between activated and un-activated states. In the activated state, the electro-optic medium may be operable to exhibit a change in its extinction coefficient at one or more visible wavelengths of light upon exposure to an electrical potential. Additionally, the electro-optic medium may be further operable to substantially transmit light in the first wavelength range while in both activated and un-activated states. In such an embodiment, the transflective element may be further disposed in a second direction relative the electro-optic medium. The second direction may be opposite the first direction.

In some embodiments, the rearview assembly may further comprise a micro-lens array film operable to alter the direction of light transmitted therethrough. The micro-lens array film may be disposed in the first direction relative the backlight. Further, the micro-lens array film may be disposed in the second direction relative the transflective element.

In some embodiments, the rearview assembly may further comprise a bandpass filter. The bandpass filter may be disposed in the first direction relative the backlight and/or in the second direction relative the transflective element. Further, the bandpass filter may be operable to transmit a second wavelength range of light. The second wavelength range may be within the first wavelength range. In some such embodiments, the rearview assembly may further comprise an imager operable to image in the second wavelength range.

In some embodiments, the backlight may comprise one or more emitters, and a wedge optic assembly. Each emitter may be operable to emit light in a second wavelength range. The wedge optic assembly may be disposed proximate the one or more emitters. Further, the wedge optic assembly may be operable to receive light in the second wavelength range and transmit the light in the first direction. In some such embodiments, the second wavelength range may be the same as the first wavelength range. In other such embodiments, the second wavelength range may be different than the first wavelength range. The backlight may further comprise a color conversion film disposed in the first direction relative the wedge optic assembly. The color conversion film may be operable to absorb light in the second wavelength range and emit light in the first wavelength range.

According to another aspect of the present disclosure, a rearview assembly is disclosed. The rearview assembly may comprise a backlight, a light diffuser, and/or a liquid crystal display element. The backlight may be operable to emit light in a first direction. The light may comprise a first wavelength range associated with at least one of infra-red and near infra-red light. Additionally, the light may further comprise a second wavelength range associated with visible light. The light diffuser may be disposed in the first direction relative the backlight. The liquid crystal display element may be disposed in the first direction relative the light diffuser. The liquid crystal display element may be operable to substantially transmit the light of the first wavelength range. Additionally, the liquid crystal display element may be operable to variably transmit the light of the second wavelength range to produce an image visible in the first direction.

In some embodiments, the backlight may comprise one or more first emitters, one or more second emitters, and a wedge optic assembly. Each first emitter may be operable to emit light in a third wavelength range. Similarly, each second emitter may be operable to emit light in a fourth wavelength range. The wedge optic assembly may be disposed proximate the first and second emitters. Further, the wedge optic assembly may be operable to receive light in the third and fourth wavelength ranges and transmit the light in the first direction. In some such embodiments, the third wavelength range may be the same as the first wavelength range, and/or the fourth wavelength range may be the same as the second wavelength range. In other such embodiments, the third wavelength range may be different than the first wavelength range and/or the fourth wavelength range may be different than the second wavelength range. In such an embodiment, the backlight may further comprise a color conversion film disposed in the first direction relative the wedge optic assembly. The color conversion film may be operable to absorb light in the third and fourth wavelength ranges and emit light in the first and second wavelength ranges.

In some embodiments, the rearview assembly may further comprise a dual brightness enhanced film. The dual brightness enhanced film may be disposed in the first direction relative the backlight. Further, the dual brightness enhanced film may be disposed in the second direction relative the liquid crystal display element.

In some embodiments, the rearview assembly may further comprise a transflective element. The transflective element may be disposed in the first direction relative the light diffuser. Further, the transflective element may be operable to: substantially transmit light from a second direction in the first and second wavelength ranges, and substantially reflect visible light from the first direction. In such an embodiment, the second direction is opposite the first direction.

In some such embodiments, the rearview assembly may further comprise an electro-optic element disposed in the first direction relative the light diffuser. The electro-optic element may comprise a first substrate, a second substrate, a first electrode, a second electrode, and/or an electro-optic medium. The first substrate may have a first surface and a second surface. The second substrate may have a third surface and a fourth surface. Further, the second substrate may be disposed in a spaced apart relationship with the first substrate. The first electrode may be associated with the second surface. The second electrode may be associated with the third surface. The electro-optic medium may be disposed between the first and second substates. Further, the electro-optic medium may be operable between activated and un-activated states. In the activated state, the electro-optic medium may be operable to exhibit a change in its extinction coefficient at one or more visible wavelengths of light upon exposure to an electrical potential. Additionally, the electro-optic medium may be further operable to substantially transmit light in the first wavelength range while in both activated and un-activated states. In such an embodiment, the transflective element may be further disposed in a second direction relative the electro-optic medium.

According to yet another aspect of the present disclosure, a system is disclosed. The system may include a rearview assembly, an imager, and/or a controller. The rearview assembly may comprise a backlight. Further, the rearview assembly may be operable, at a surface, to provide a driver with a view of a scene rearward of a vehicle. Additionally, the rearview assembly may be operable to emit light from the surface to illuminate the driver with at least one of infra-red and near infra-red light from the backlight. The emitted light may have a central emission trajectory. In some embodiments, the light emitted from the surface is emitted substantially across an entirety of the surface. The imager may be operable to image the driver in the at least one of infra-red and near infra-red light. Further, the imager may have an optical axis. Additionally, in some embodiments, imager may be disposed in a spaced apart relationship with the rearview assembly. Additionally or alternatively, an intersection of the optical axis and the central emission trajectory forms an angle greater than five degrees. In some embodiments, the angle may be approximately eight degrees. Additionally, the intersection may be between 0.4 and 0.8 meters from the imager. The controller may be communicatively connected to the imager and operable to analyze images of the driver to perform at least one of a biometric and a driver awareness analysis.

The advantages of certain embodiments of the present disclosure include superior heat dissipation. Light emitters, particularly infra-red and near infra-red light emitters generate substantial amounts of heat. Additionally, point source emitters concentrate the heat in a small area, which is hard to dissipate, particularly when operating at a high intensity. However, the backlight in the rearview assembly provides for a larger area for emitting the light and therefore a lower concentration of heat and superior dissipation. Additionally, the backlight provides for hidden illumination that is less noticeable to the driver. Embodiments of the rearview assembly have the advantage of providing more uniform illumination of the driver. The Backlight may spread the illumination out across a relatively large area, which may provide for more even illumination of the driver, unlike point source illumination which is more susceptible to shadows and uneven illumination of on the driver.

Additionally, advantages of certain embodiments of the present disclosure include superior image quality. Specular reflection may be caused by direct reflection off a driver's retina. The reflection may be fairly bright and often occurs with many imaging systems due to the relative positions of driver a light source, a imager, and a driver. Further, the reflection may inhibit analysis of the captured images for proper biometric authentication or driver monitoring. However, rearview assemblies, by nature of their traditional and often functional placement to provide proper fields of view rearward the vehicle, may be superiorly disposed such that an angle, relative an imager, is great enough to substantially eliminate or diminish the retina reflection, particularly when the imager is disposed in or proximate the vehicle headliner.

These and other aspects, objects, and features of the present disclosure will be understood and appreciated by those skilled in the art upon studying the following specification, claims, and appended drawings. It will also be understood that features of each embodiment disclosed herein may be used in conjunction with, or as a replacement for, features in other embodiments.

DETAILED DESCRIPTION

For the purposes of description herein, specific devices and processes illustrated in the attached drawings and described in this disclosure are simply exemplary embodiments of the inventive concepts defined in the appended claims. Hence, specific characteristics relating the embodiments disclosed herein are not to be considered as limiting, unless the claims expressly state otherwise.

Figure 1:
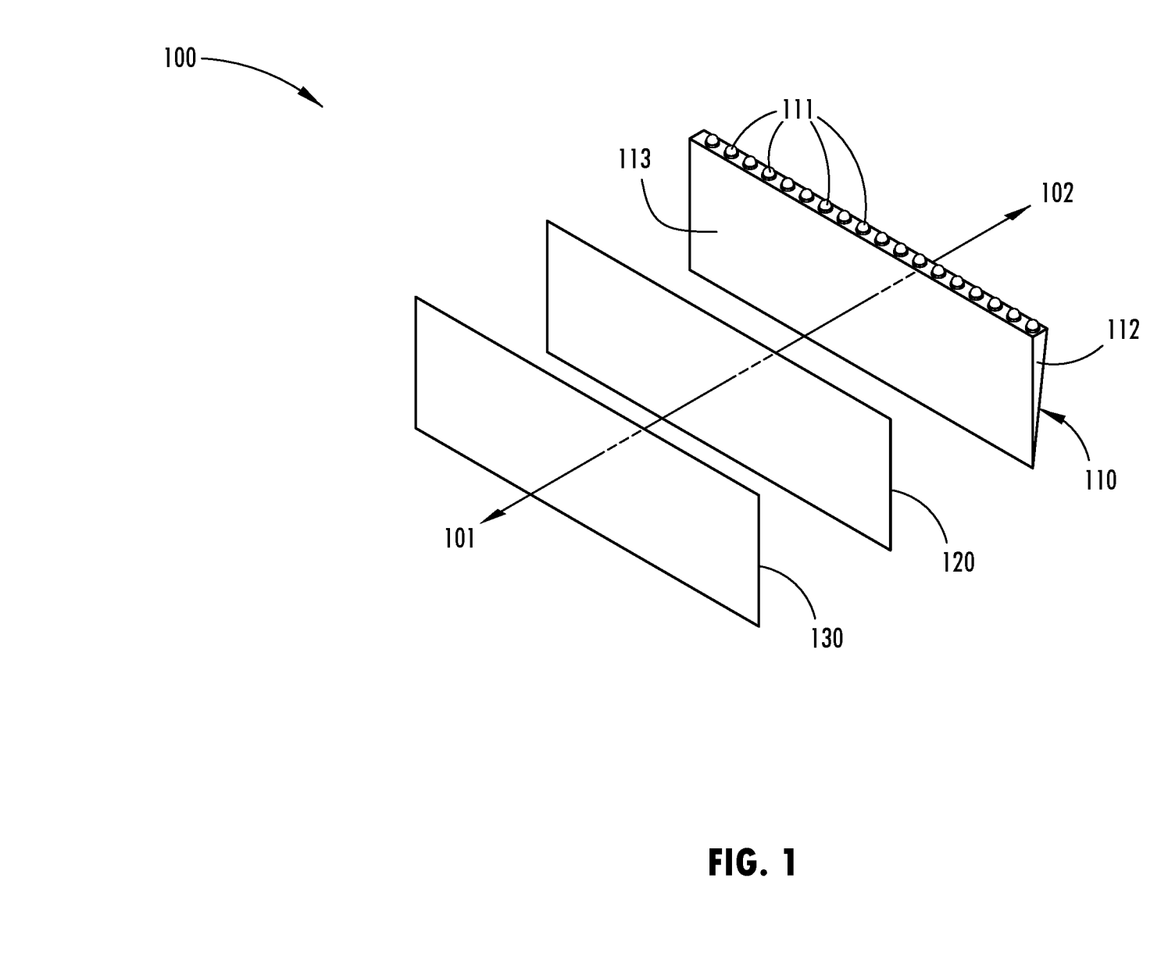
FIG. 1: An exploded view of an embodiment of a rearview assembly.

FIG. 1 illustrates an exploded view of an embodiment of a rearview assembly 100. Rearview assembly 100 may comprise a backlight 110, a diffuser 120, and/or a transflective element 130. Further, rearview assembly 100 may be disposed in a vehicle interior and may be operable to provide a driver with a view of a scene to the rear of the vehicle.

Backlight 110 is operable to emit light having a first wavelength range in a first direction 101. The first wavelength range may be associated with infra-red and/or near infra-red light. In some embodiments, backlight 110 may be an edge-lit backlight. Additionally, backlight 110 may comprise one or more emitters 111 and a wedge optic assembly 112. The one or more emitters 111 may be one or more light emitting diodes (LED). Further, the one or more emitters 111 may be operable to emit light having a second wavelength range in the direction of wedge optic assembly 112. In some embodiments, the emitters may be addressable and selectively activated. The second wavelength range may be the same or different relative the first wavelength range. Wedge optic assembly 112 may be disposed proximate the one or more emitters 111. Further, wedge optic assembly 112 may be operable to receive the light from the one or more emitters 111 and transmit the light in the first direction 101 through a planar surface 113. In some embodiments, planar surface 113 need not be perfectly planar and may be substantially planar.

Figure 2:
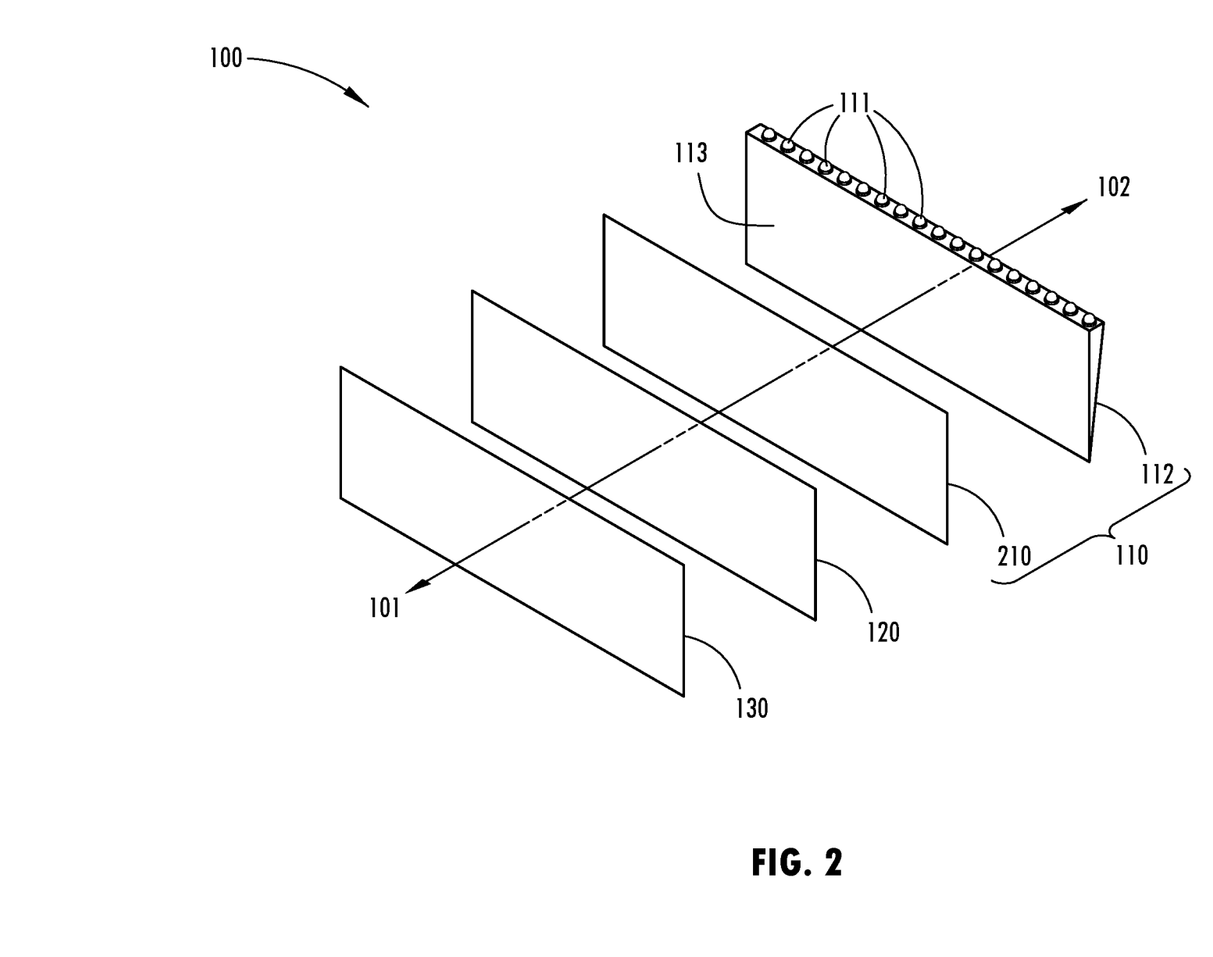
FIG. 2: An exploded view of an embodiment of a rearview assembly.

In some embodiments, as shown in FIG. 2, backlight 110 may further comprise a color conversion film 210. In some embodiments, color conversion film 210 may be disposed in a spaced apart relationship in the first direction 101 relative planar surface 113. Alternatively, in other embodiments, color conversion film 210 may be associated with planar surface 113. Color conversion film 210 is operable to absorb light in the second wavelength range and emit light in the first wavelength range. Accordingly, color conversion film 210 may be a quantum dot or a perovskite film. In embodiments where backlight 110 further comprises color conversion film 210, the second wavelength range may be of a range not associated with infra-red and/or near infra-red light. For example, the second wavelength range may be associated with at least one of blue light and ultra-violet light.

Diffuser 120 may be disposed in in the first direction 101 relative backlight 110 and/or planar surface 113. Further, diffuser 120 may be disposed in a spaced apart relationship with backlight 110 or in abutting contact with planar surface 113 of backlight 110. Additionally, diffuser 120, for example, may be any suitable light diffuser operable to scatter light transmitted therethrough.

Transflective element 130 may be disposed in the first direction 101 relative diffuser 120. Further, transflective element 130 may be operable to substantially transmit light in the first wavelength range from the first direction 101. Additionally, transflective element 130 may be further operable to substantially reflect visible light from a second direction 102, the second direction 102 being opposite the first direction 101. By reflecting visible light from the first direction 101, transflective element 130 may be operable to serve as a visible spectrum mirror and provide a driver with a view of a scene to a rear of a vehicle. In some embodiments, transflective element 130 may be a dichroic mirror or a mirror with other types of edge or band pass filters.

Figure 3:
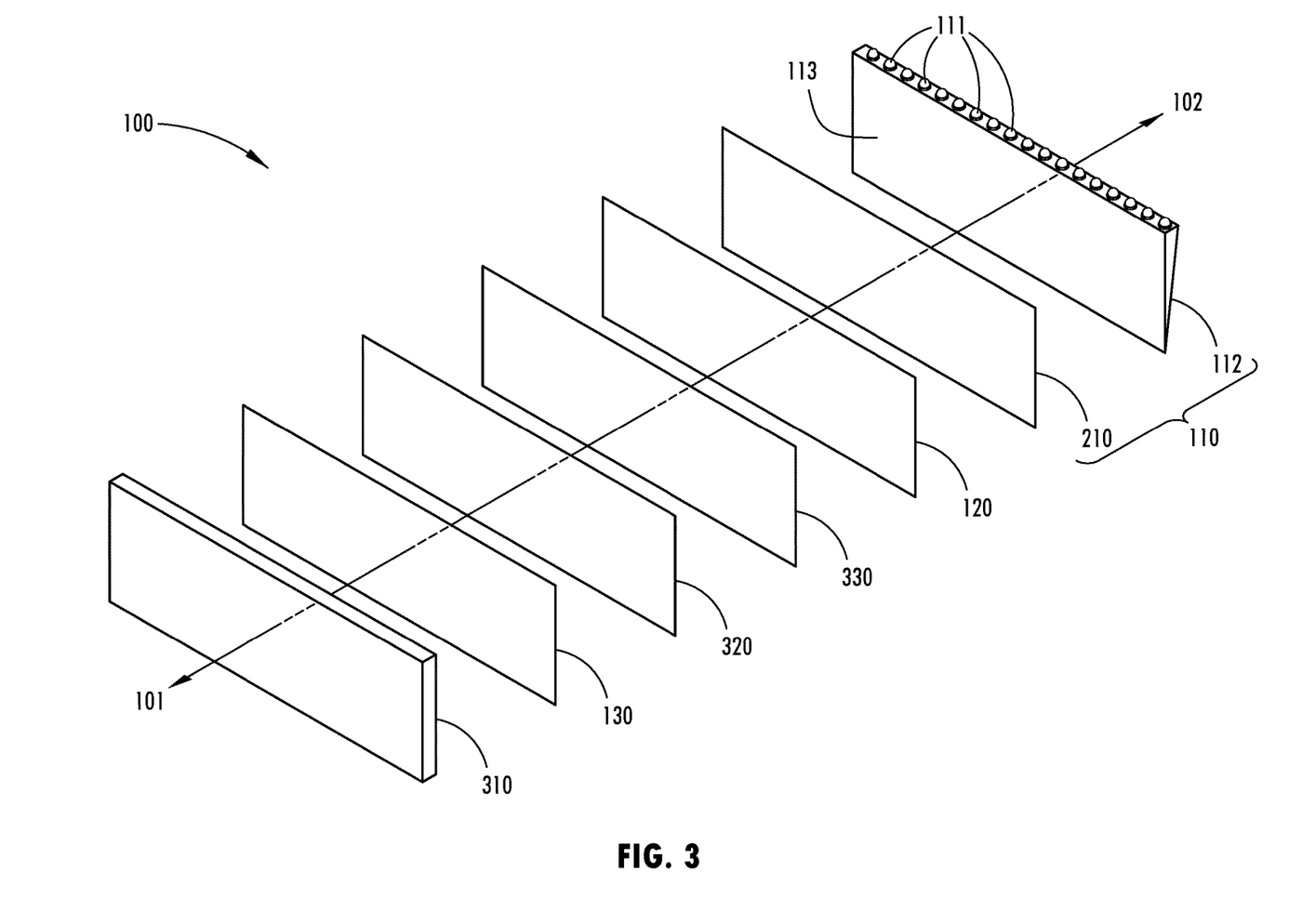
FIG. 3: An exploded view of an embodiment of a rearview assembly.

Additionally, in some embodiments, as shown in FIG. 3, the rearview assemblies 100 of FIGS. 1-2 may each further comprise an electro-optic element 310, a micro-lens array 320, and/or a bandpass filter 330.

Figure 4:
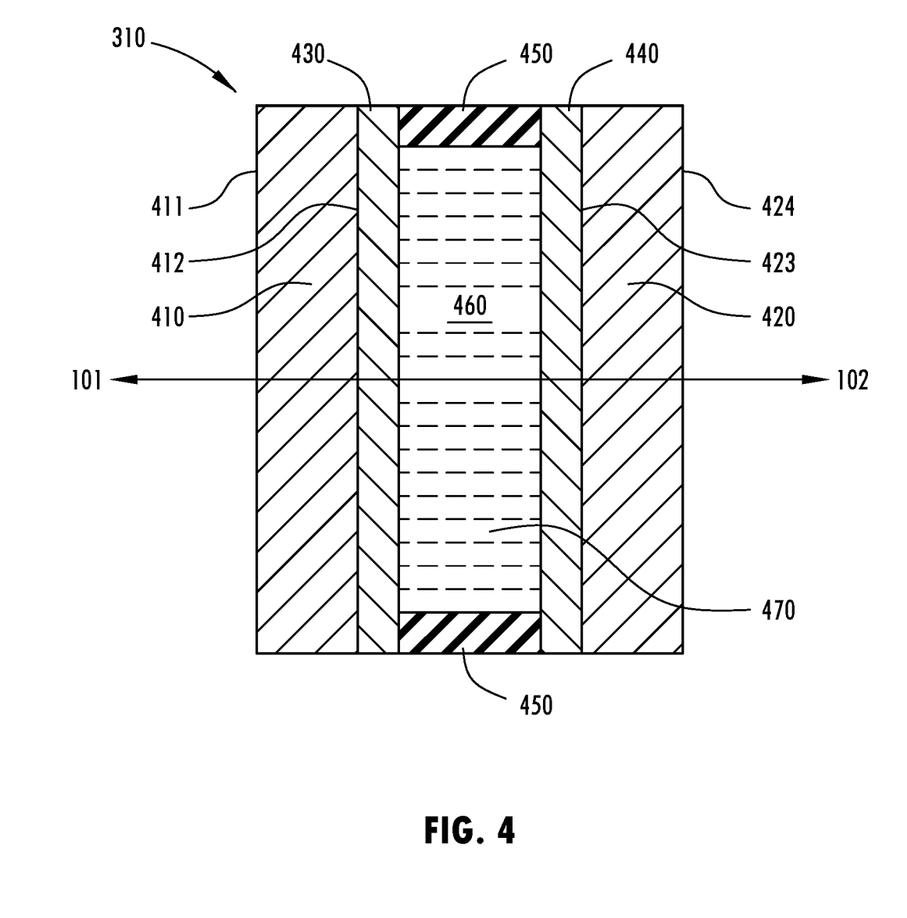
FIG. 4: A cross sectional view of an electro-optic element.

Electro-optic element 310, may be disposed in the first direction 101 relative transflective element 130, micro lens array 320, bandpass filter 330, diffuser 120, and/or backlight 110. Further, electro-optic element 310 may be operable to vary a degree of visible light transmissivity therethrough. As shown in FIG. 4, electro-optic element 310 may comprise a first substrate 410, a second substrate 420, a first electrode 430, a second electrode 440, a seal 450, a chamber 460, and/or an electro-optic medium 470. Additionally, in embodiments where rearview assembly 100 comprises electro-optic element 310, transflective element 130 may be disposed in the second direction 102 relative electro-optic medium 470.

First substrate 410 comprises a first surface 411 and a second surface 412. Further, first substrate 410 may be fabricated from any one of a number of materials that are transparent or substantially transparent in the visible region of the electromagnetic spectrum, such as borosilicate glass, soda lime glass, float glass, natural and synthetic polymeric resins, plastics, and/or composites including Topas®, which is commercially available from Ticona of Summit, N.J. While particular substrate materials are disclosed, for illustrative purposes only, other materials known in the art may be used.

Second substrate 420 may be disposed in a spaced apart relationship with first substrate 410. Further, second substrate 420 comprises a third surface 423 and a fourth surface 424. Additionally, second substate 420 may be disposed such that third surface 423 faces second surface 412. Also, second substrate 420 may be fabricated from similar materials as those suitable for first substrate 410.

First electrode 430 is an electrically conductive material associated with second surface 412. The electrically conductive material may be substantially transparent in the visible region of the electromagnetic spectrum and generally resistant to corrosion from materials contained in chamber 460. Accordingly, for example, the electrically conductive material may be a transparent conductive oxide (TCO) such fluorine doped tin oxide (FTO), indium tin oxide (ITO), or indium zinc oxide (IZO).

Similarly, second electrode 440 is an electrically conductive material associated with third surface 423. Further, the electrically conductive material of the second electrode 540 may be comprised of the same materials as those suitable for first electrode 430. In some embodiments, second electrode 440 may comprise transflective element 130.

Seal 450 may be disposed between the first and second substrates 410, 420 in a peripheral manner to define a chamber 460 in combination with juxtaposed first and second electrodes 430, 440. Further, seal 450 may comprise any material capable of being adhesively bonded to first and second electrodes 430, 440 to in turn seal chamber 460, such that the electro-optic medium 470 may not inadvertently leak out. Additionally, seal 450 may extend to the second and/or third surfaces 412, 423. In such an embodiment, the first and second electrodes 430, 440 may be partially removed where seal 450 is positioned. Alternatively, sealing member 450 may be disposed about and extending between the peripheries of the first and second substrates 410, 420.

Electro-optic medium 470 may be disposed in chamber 460. In some embodiments, electro-optic medium 470 may be electrochromic. Further, electro-optic medium 470 is operable to enter and/or maintain an activated state upon exposure to an electrical potential. In an activated state, electro-optic medium 470 is operable to exhibit a change, relative an un-activated state, in its extinction coefficient at one or more wavelengths in the electromagnetic spectrum. In some embodiments, this change may occur in the visible region of the electromagnetic spectrum. Additionally, electro-optic medium 470 may be operable to transmit light in the first wavelength range while in both activated and de-activated sates. Accordingly, the change in extinction coefficient may occur at a wavelength outside of the first wavelength range. Specifically, the transmission may be of light from the second direction 102 traveling in the first direction 101.

Micro lens array 320 may be disposed in the first direction 101 relative backlight 110, color conversion film 210, diffuser 120, and/or bandpass filter 330. Additionally, micro lens array 320 may be further disposed in the second direction relative electro-optic element 310, transflective element 130, bandpass filter 330, and/or color conversion film 210. Micro lens array 320 may be a film comprising an array of micro lenses operable to alter the direction of light transmitted therethrough. In some embodiments, micro lens array 320 may be a nano lens array.

Bandpass filter 330 may be disposed in the first direction 101 relative backlight 110. Additionally, bandpass filter 430 may be disposed in the second direction 102 relative transflective element 130. Further, bandpass filter 430 is a filter operable to be substantially transparent in a third wavelength range and substantially opaque outside of the third wavelength range. In some embodiments, bandpass filter 330 may be an edge filter. The third wavelength range may be within the first wavelength range. Further, the third range may be substantially aligned with a wavelength range of an imager's imaging.

In operation, backlight 110 may emit light having a first wavelength range in the first direction 101. In some embodiments, this may be achieved by an emission of light from the one or more emitters 111 being re-directed in the first direction 101 by wedge optic assembly 112. In embodiments where rearview assembly 100 comprises color conversion film 210, the wavelength range of the emitted light is shifted to the first wavelength range. Subsequently, after emission of the light by backlight 110, the light may be diffused by diffuser 120 in order to achieve an even projection of the light in the first direction 101. In some embodiments, the light may then pass-through micro-lens array 320 and have its trajectory altered such that a likelihood of the light being directed at a driver is increased. In some embodiments, the light may pass through bandpass filter 330, narrowing the first wavelength range. Further the light may be transmitted through transflective element 130 and/or electro-optic element 310 to provide illumination by rearview assembly 100 within the first wavelength range. Additionally, visible light may encounter rearview assembly 100 from the first direction 101. The visible light may be reflected off transflective element 130. Accordingly, rearview assembly 100 may serve as a mirror. Additionally, the visible light may be transmitted through electro-optic element 310 before and after reflection whereby it may be dimmed.

Some embodiments of rearview assembly 100 may have the advantage of superior heat dissipation. Light emitters, particularly near-infra red light emitters may generate substantial amounts of heat. Additionally, point source emitters may concentrate all of the heat in a small area, which is hard to dissipate, particularly when operating at a high intensity. However, a backlight 110 in a rearview assembly 100 provides for a larger area for emitting the light and therefore a lower concentration of heat and superior dissipation. Additionally, backlight 110 provides for hidden illumination that is less noticeable to the driver. Further, embodiments of rearview assembly 100 may have the advantage of providing more uniform illumination of the driver. Backlight 110 may spread the illumination out across a relatively large area, which may provide for more even illumination of the driver, unlike point source illumination which is more susceptible to shadows and uneven illumination of on the driver.

Figure 5:
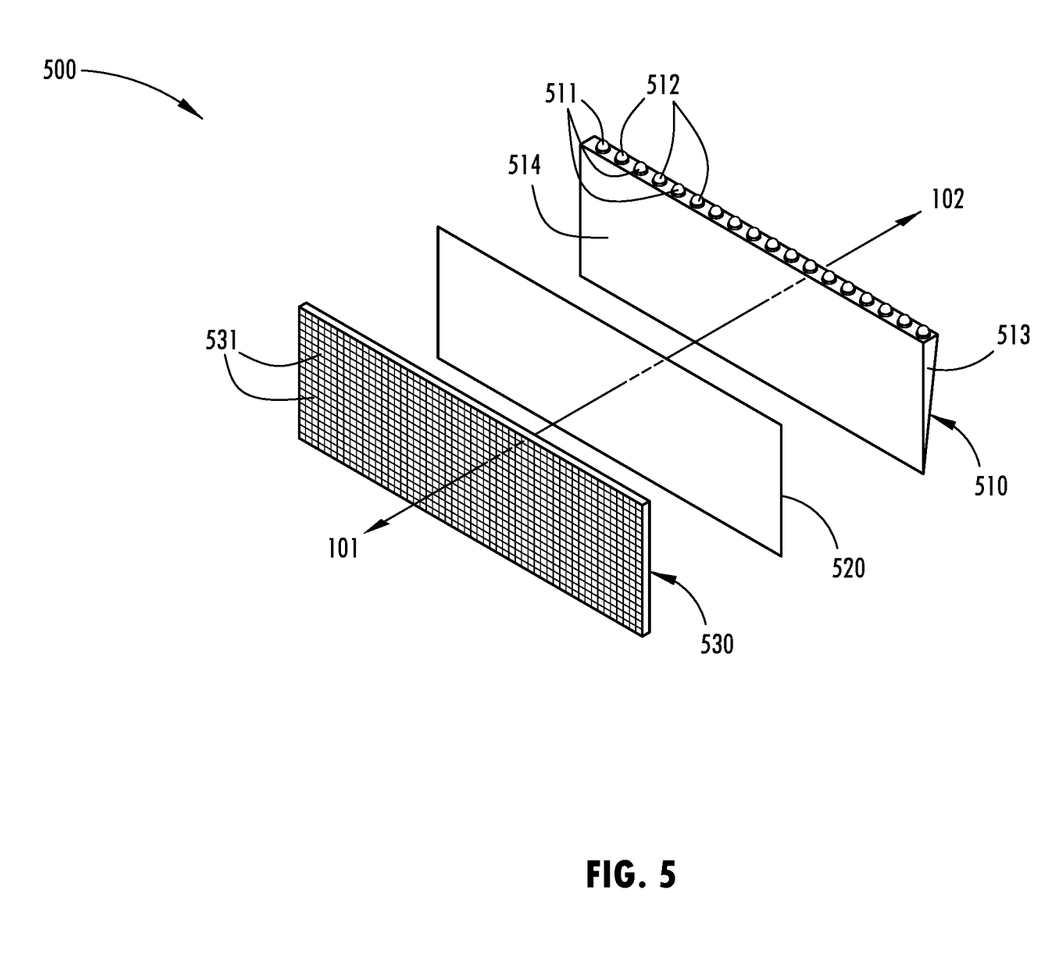
FIG. 5: An exploded view of an embodiment of a rearview assembly.

FIG. 5 illustrates an exploded view of an alternative embodiment of a rearview assembly 500. Rearview assembly 500 may comprise a backlight 510, a diffuser 520, and/or a display element 530. Further, rearview assembly 500 may be disposed in a vehicle interior and may be operable to provide a driver with a view of a scene to the rear of the vehicle.

Backlight 510 may be operable to emit light having a first wavelength range and/or light having a second wavelength range in a first direction 101. The first wavelength range may be associated with infra-red and/or near infra-red light. The second wavelength range may be associated with visible light. Specifically, the visible light may be red, green, and blue light. In some embodiments, backlight 510 may be and edge-lit backlight. Further, backlight 510 may comprise one or more first emitters 511 and a wedge optic assembly 513. Additionally, backlight 510 may further comprise one or more second emitters 512. The one or more first and second emitters 511, 512 may be one or more light emitting diodes (LED). Further, the one or more first emitters 511 may be operable to emit light having a third wavelength range in the direction of wedge optic assembly 513. The third wavelength range may be the same or different relative the first wavelength range. The one or more second emitters 512 may be operable to emit light having a fourth wavelength range in the direction of wedge optic assembly 513. The fourth wavelength range may be the same or different relative the second wavelength range. In some embodiments, the one or more first and/or second emitters 511, 512 may be addressable and selectively activated. Wedge optic assembly 513 may be disposed proximate the one or more first and/or second emitters 511, 512. Additionally, wedge optic assembly 513 may be operable to receive the light from the one or more first and/or second emitters 511, 512 and transmit the light in the first direction 101 through a planar surface 514. In some embodiments, planar surface 514 need not be perfectly planar but may be substantially planar.

Figure 6:
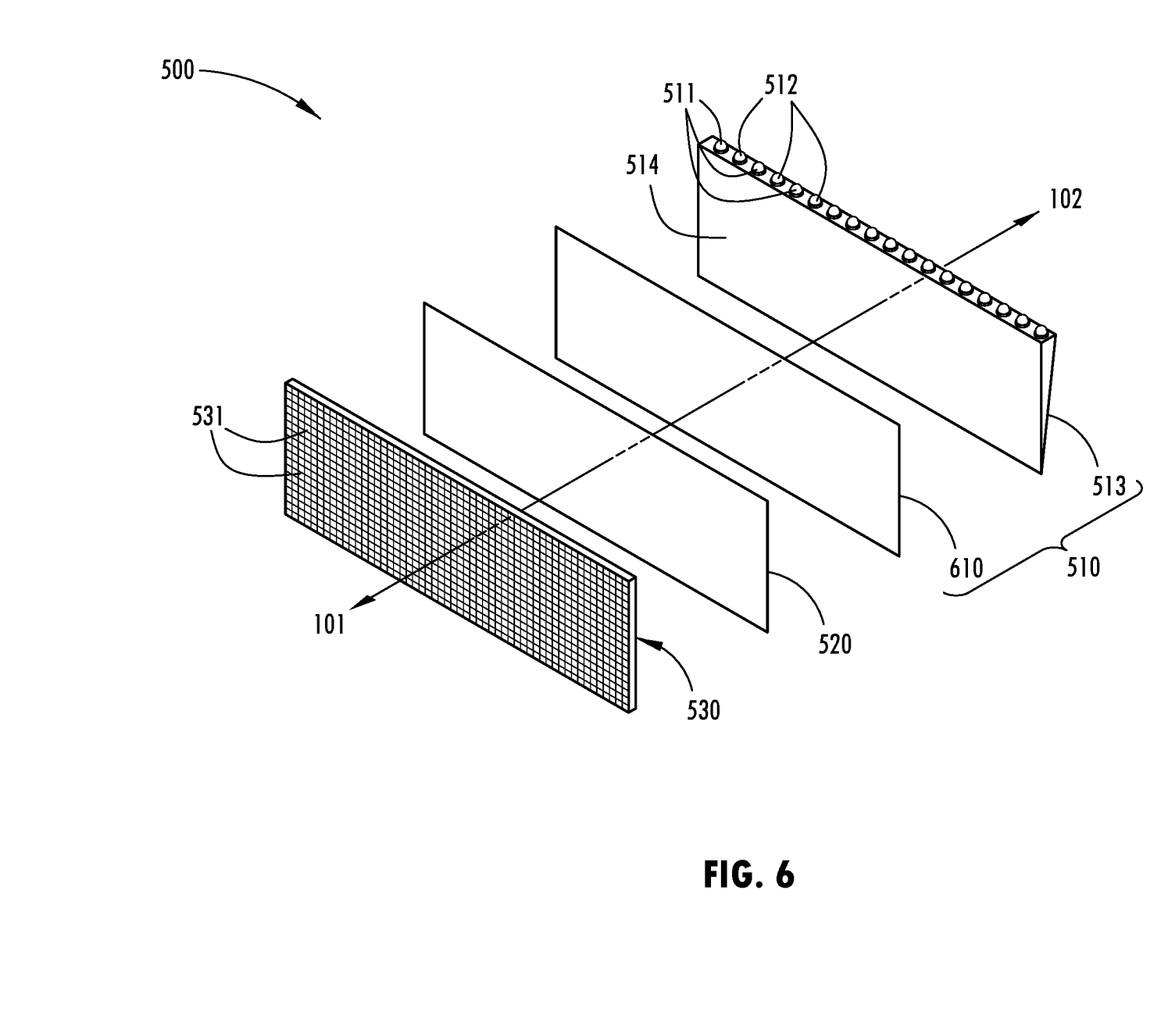
FIG. 6: An exploded view of an embodiment of a rearview assembly.

In some embodiments, as shown in FIG. 6, backlight 510 may further comprise a color conversion film 610. In some such embodiments, color conversion film 610 may be disposed in a spaced apart relationship in the first direction 101 relative planar surface 514. Alternatively, in other such embodiments, color conversion film 610 may be associated with planar surface 514. Further, color conversion film 610 may be operable to absorb light in the third and/or fourth wavelength ranges and emit light in the first and/or second wavelength ranges. Accordingly, color conversion film 610 may be a quantum dot or a perovskite film. In embodiments where backlight 510 further comprises color conversion film 610, the third wavelength range may be of a range not associated with infra-red and/or near infra-red light. Additionally, the fourth wavelength range may be of a range not associated with red, green, and/or blue light. For example, the fourth wavelength range may be associated with at least one of blue light and ultra-violet light.

Diffuser 520 may be disposed in the first direction 101 relative color conversion film 610 and/or planar surface 514 of backlight 510. Further, diffuser 520 may be disposed in a spaced apart relationship or in abutting contact with planar surface 514 and/or color conversion film 610. Additionally, diffuser 520 is a light diffuser operable to scatter light transmitted therethrough.

Display element 530 may be disposed in the first direction 101 relative diffuser 520 and/or color conversion film 610. Further, display element 530 may be operable to variably transmit the light of the second wavelength range therethrough to generate an image viewable from the first direction 101. Additionally, display element 530 may transmit light within the first wavelength range. Accordingly, display element 530 may be a liquid crystal display panel. Display element 530, may comprise an array of pixels 531. Each pixel 531 of display element 530 may correspond to a plurality of liquid crystal cells. The plurality of liquid crystal cells may comprise a first liquid cell with a red filter, a second liquid crystal cell with a green filter, and a third liquid crystal cell with blue filter. Each liquid crystal cell, independently, may be variably activated. The degree of activation may correspond to a degree of transmission of light of the second wavelength range through the cell and therefore through the respective filter. By selecting activation of the first, second, and third liquid crystal cells relative one another, the light may accordingly be blended to create a pixel color and/or brightness. As a collective, the second array of pixels 531 is operable to generate a first image in the second wavelength range. The first image may correspond to a scene rearward the vehicle. Additionally, display element 530 may substantially transmit light in the first wavelength range. Accordingly, light in the first wavelength range may be substantially transmitted through each liquid crystal cell regardless of the liquid crystal cell's degree of activation.

Figure 7:
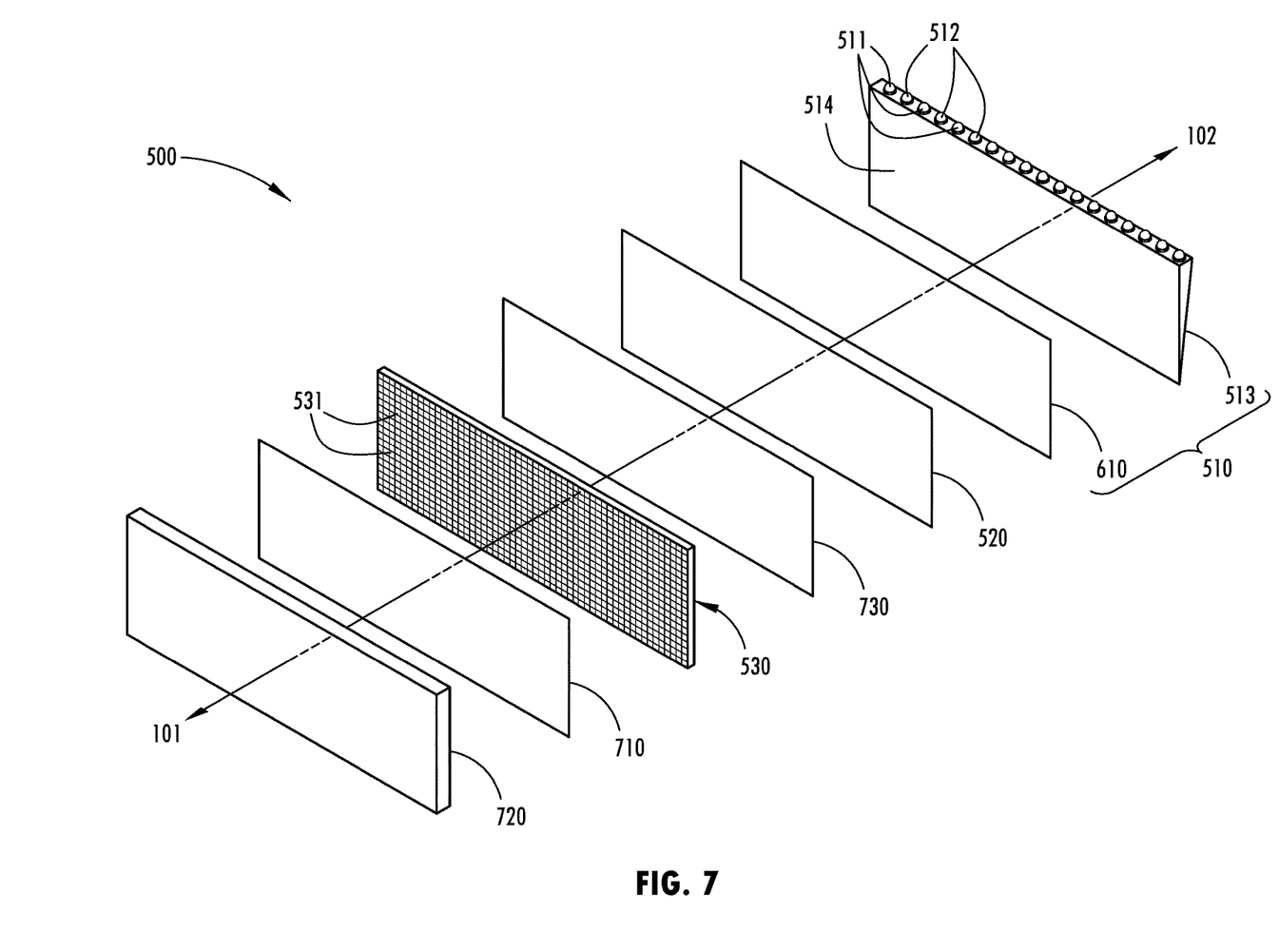
FIG. 7: An exploded view of an embodiment of a rearview assembly.

Additionally, in some further embodiments, as shown in FIG. 7, the rearview assemblies of FIGS. 6-7 may each further comprise a transflective element 710, an electro-optic element 720, and/or a brightness enhancement layer 730.

Transflective element 710 may be disposed in the first direction 101 relative display 530. Further, transflective element 710 may be operable to substantially transmit light of the first and second wavelength ranges traveling in the first direction 101. Additionally, transflective element 710 may be operable to substantially reflect visible light from the first direction 101. By reflecting visible light from the first direction 101, transflective element 530 may be operable to serve as a visible spectrum mirror and provide a driver with a view of a scene to a rear of the vehicle. In some embodiments, transflective element 130 may be a dichroic mirror or a mirror with other types of edge or band pass filters.

Electro-optic element 720 may be disposed in the first direction 101 relative transflective element 710 and/or display element 530. Electro-optic element 720 may be operable to vary a degree of visible light transmissivity therethrough. In some embodiments, electro-optic element 720 may be electrochromic.

Brightness enhancement layer 730 may be disposed in the second direction 102 relative display element 530 and/or diffuser 520 and/or in the first direction 101 relative backlight 510 and/or diffuser 520. Brightness enhancement layer 730 may be a member operable to reflect light from the first direction 101 and shift the polarization of the reflected light. Accordingly, brightness enhancement filter 730 may be a dual brightness enhancement film.

In operation, backlight 510 emits light having a first wavelength range and/or second wavelength range in the first direction 101. In some embodiments, this is achieved by an emission of light from the one or more first and/or second emitters 511, 512 being re-directed in the first direction 101 by wedge optic assembly 513. In embodiments where rearview assembly 100 comprises color conversion film 610, the wavelength range of the emitted light is shifted to the first and second wavelength ranges. After emission of the light by backlight 510, the light is diffused by diffuser 520 in order to achieve an even projection of the light in the first direction 101. The light may then pass-through display element 520. Upon transmission through display element 530, the light of the first wavelength range may be substantially unaffected, however the light of the second wavelength range may be variably transmitted on a pixel by pixel and color by color basis generating an image in the second wavelength range viewable in the first direction 101. In some embodiments, display element 520 may additionally reflect in the second direction 102 a portion of the light in the first and/or second wavelength ranges. This reflected light may then be re-reflected in the first direction 101 by brightness enhancement layer 730 where it may increase the brightness the display element's 530 transmission in the first direction 101 by recycling light that would otherwise be lost. In some embodiments, the light of the first wavelength range and the image of the second wavelength range may then be transmitted through transflective element 710 and/or electro-optic element 720 to provide illumination by rearview assembly 500 within the first wavelength range and a view of the first image. Additionally, visible light may encounter rearview assembly 100 from the first direction 101. The visible light may be reflected off transflective element 710. Accordingly, rearview assembly 500 may serve as a mirror. Additionally, the visible light may be transmitted through electro-optic element 720 before and after reflection whereby it may be dimmed to reduce glare.

Some embodiments of rearview assembly 500 may have the advantage of superior heat dissipation. Light emitters, particularly near-infra red light emitters generate substantial amounts of heat. Additionally, point source emitters concentrate all of the heat in a small area, which is hard to dissipate, particularly when operating at a high intensity. However, a backlight 510 in a rearview assembly 500 provides for a larger area for emitting the light and therefore a lower concentration of heat and superior dissipation. Additionally, backlight 510 provides for hidden illumination that is less noticeable to the driver. Further, embodiments of rearview assembly 500 have the advantage of providing more uniform illumination of the driver. Backlight 510 may spread the illumination out across a relatively large area, which may provide for more even illumination of the driver, unlike point source illumination which is more susceptible to shadows and uneven illumination of on the driver.

Figure 8:
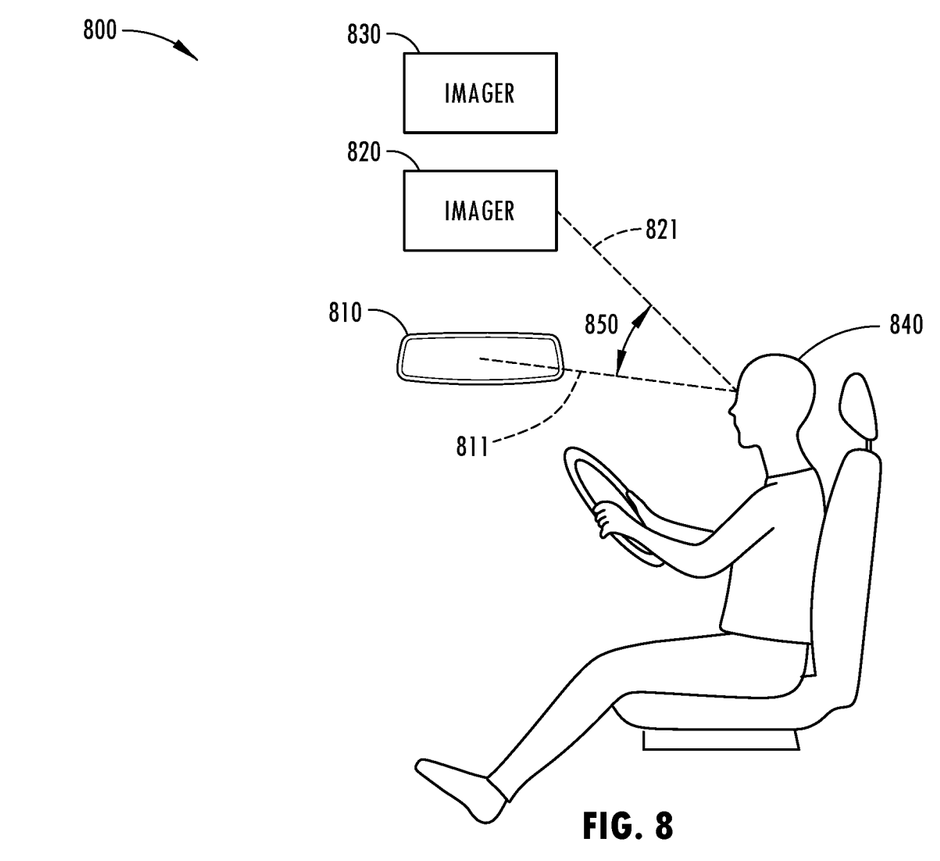
FIG. 8: A schematic representation of an imaging system.

FIG. 8 is a schematic representation of an imaging system 800. Imaging system 800 may comprise a rearview assembly 810, an imager 820, and a controller 830. Further, imaging system 800 may accordingly be disposed in a vehicle interior.

Rearview assembly 810 is disposed in the vehicle interior and is operable to provide a driver 840 with a view of a scene to the rear of the vehicle. Rearview assembly 810 may be any of the rearview assemblies of FIGS. 1-7. Accordingly, rearview assembly is operable to emit light of a first wavelength range in a direction of the driver 840. Specifically, the light may be emitted through a front surface of rearview assembly 810 in which the view of the scene to the rear of the vehicle may be viewed. Additionally, the light may be emitted substantially across the entirety of the front surface. The first wavelength range may be associated with infra-red and/or near infra-red light. The emitted light may have a central emission trajectory 811. Central emission trajectory 811 may be an average trajectory of the emitted light in the first wavelength range.

Imager 820 is likewise disposed in the vehicle interior. Further, imager 820 may be any device operable to capture light in the first wavelength range and produce a digital image. Accordingly, imager 820 may have an image sensor and a lens. Imager 820, for example, may be a camera. Further, imager 820 has an optical axis 821. Optical axis 821 may be a straight line intersecting a center of a lens of imager 820, and a center of the image sensor. Imager 820 may be disposed such that optical axis 821 and central emission trajectory 811 intersect in an area where driver 840 and/or the driver's head is likely to be located. In some embodiments, the distance from imager 820 and/or rearview assembly 810 to the intersection of central emission trajectory 811 and optical axis 821 may be any range between about 0.4 and 0.9 meters or about 0.55 meters. Additionally, imager 820 may be further disposed such that optical axis 821 and central emission trajectory 811 intersect forming an angle 850. Angle 850 may be about or greater than 5, 6, 7, 8, 9, or 10 degrees.

Controller 830 may be communicatively connected to imager 820. Communicatively connected may mean directly connected or indirectly connected through one or more component. Further, controller 830 may comprise a memory and a processor. The memory may be operable to store one or more driver analysis algorithm. The driver analysis algorithm, for example, may be a driver monitoring algorithm operable to determine the driver's 840 alertness or a biometric authentication algorithm operable to biometrically identify driver 840 based on one or more feature such as the driver's 840 face and/or iris. The processor may be operable to execute the driver analysis algorithm to analyze images capture by imager 820.

Embodiments of imaging system 800 may have the advantage of superior image quality. Specular reflection may be caused by direct reflection off a driver's 840 retina. The reflection may be fairly bright and often occurs with many imaging systems due to the relative positions of driver a light source, a imager, and a driver. Further, the reflection may inhibit analysis of the captured images for proper biometric authentication or driver monitoring. However, rearview assemblies, by nature of their traditional and often functional placement to provide proper fields of view rearward the vehicle, may be superiorly disposed such that angle 850, relative an imager 830, is great enough to substantially eliminate or diminish the retina reflection, particularly when imager 830 is disposed in or proximate the vehicle headliner.

As used herein, the term "and/or," when used in a list of two or more items, means that any one of the listed items can be employed by itself, or any combination of the two or more of the listed items can be employed. For example, if a composition is described as containing components A, B, and/or C, the composition can contain A alone; B alone; C alone; A and B in combination; A and C in combination; A and C in combination; B and C in combination; or A, B, and C in combination.

In this document, relational terms, such as "first," "second," and the like, are used solely to distinguish one entity or action from another entity or action, without necessarily requiring or implying any actual such relationship or order between such entities or actions.

The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The term "substantially," and variations thereof, will be understood by persons of ordinary skill in the art as describing a feature that is equal or approximately equal to a value or description. For example, a "substantially planar" surface is intended to denote a surface that is planar or approximately planar. Moreover, "substantially" is intended to denote that two values are equal or approximately equal. If there are uses of the term which are not clear to persons of ordinary skill in the art, given the context in which it is used, "substantially" may denote values within about 10% of each other, such as within about 5% of each other, or within about 2% of each other.

It is to be understood that although several embodiments are described in the present disclosure, numerous variations, alterations, transformations, and modifications may be understood by one skilled in the art, and the present disclosure is intended to encompass these variations, alterations, transformations, and modifications as within the scope of the appended claims, unless their language expressly states otherwise.

What is claimed is:

1. A rearview assembly comprising:
   a backlight operable to emit light in a first direction, the light having a first wavelength range associated with at least one of infra-red and near infra-red light;
   a light diffuser disposed in the first direction relative the backlight; and
   a transflective element operable to substantially transmit light in the first wavelength range and substantially reflect visible light, the transflective element disposed in the first direction relative the light diffuser;
   an electro-optic element disposed in the first direction relative the light diffuser, the electro-optic element comprising:
      a first substrate having a first surface and a second surface,
      a second substrate having a third surface and a fourth surface, the second substrate disposed in a spaced apart relationship with the first substrate,
      a first electrode associated with the second surface,
      a second electrode associated with the third surface,
      an electro-optic medium disposed between the first and second substates, the electro-optic medium operable to:
         activate to exhibit a change in its extinction coefficient at one or more visible wavelengths of light upon exposure to an electrical potential, and
         substantially transmit light in the first wavelength range while in both activated and un-activated states;
   wherein the transflective element is further disposed in a second direction relative the electro-optic medium, the second direction opposite the first direction.

2. The rearview assembly of claim 1, further comprising a micro-lens array film operable to alter the direction of light transmitted therethrough, the micro-lens array film disposed in the first direction relative the backlight and in the second direction relative the transflective element.

3. The rearview assembly of claim 1, further comprising a bandpass filter disposed in the first direction relative the backlight and in the second direction relative the transflective element, the bandpass filter operable to transmit a second wavelength range of light, the second wavelength range within the first wavelength range.

4. The rearview assembly of claim 3, further comprising an imager operable to image in the second wavelength range.

5. The rearview assembly of claim 1, wherein the backlight comprises:
  one or more emitters, each emitter operable to emit light in a second wavelength range;
  a wedge optic assembly disposed proximate the one or more emitters, the wedge optic assembly operable to receive light in the second wavelength range and transmit the light in the first direction.

6. The rearview assembly of claim 5, wherein the second wavelength range is the same as the first wavelength range.

7. The rearview assembly of claim 5, wherein:
  the second wavelength range is different than the first wavelength range; and
  the backlight further comprises a color conversion film disposed in the first direction relative the wedge optic assembly, the color conversion film operable to absorb light in the second wavelength range and emit light in the first wavelength range.

\* \* \* \* \*